United States Patent [19]

Anger

[11] Patent Number: 4,684,226

[45] Date of Patent: Aug. 4, 1987

[54] TEMPLE END PIECE FOR A TEMPLE OF A SPECTACLE FRAME

[76] Inventor: Wilhelm Anger, Via Brattas 4, CH-7500 St. Moritz, Switzerland

[21] Appl. No.: 741,847

[22] Filed: Jun. 6, 1985

[30] Foreign Application Priority Data

Dec. 18, 1984 [DE] Fed. Rep. of Germany ....... 3446184

[51] Int. Cl.⁴ ......................... G02C 5/14; G02C 3/00
[52] U.S. Cl. .................................... 351/123; 351/157
[58] Field of Search ........................ 351/123, 156, 157

[56] References Cited

U.S. PATENT DOCUMENTS 460,576 10/1891 Halbe ................................. 351/123

Primary Examiner—Rodney B. Bovernick

[57] ABSTRACT

A temple end piece for a temple of a spectacle frame is comprised of a first segment running essentially straight in the longitudinal direction of the temple, a connecting segment extending downward from the first segment, and a fitting segment intended for fitting on the head and/or behind the ear. The longitudinal fitting segment is borne and supported by the connecting segment, whereby this support is achieved at the longitudinal middle or at the lower end or in the region between the longitudinal middle and the lower end of the fitting segment, so that a least the upper half of the fitting segment projects freely upward to the first segment and can be deflected elastically in the direction toward the connecting segment. This capability of an elastic deflection is furnished by a suitable choice of material, as, for example, a suitable plastic material, and/or specially designed elastic regions. The upper end of the fitting segment is in interconnection with the first segment in such a manner that the deflection movement is unimpeded in the desired degree while simultaneously the upper end is enclosed by the first segment, so that the upper end can form no hook-like tips and is, in addition to this, prevented from undesired deflection movements.

23 Claims, 10 Drawing Figures

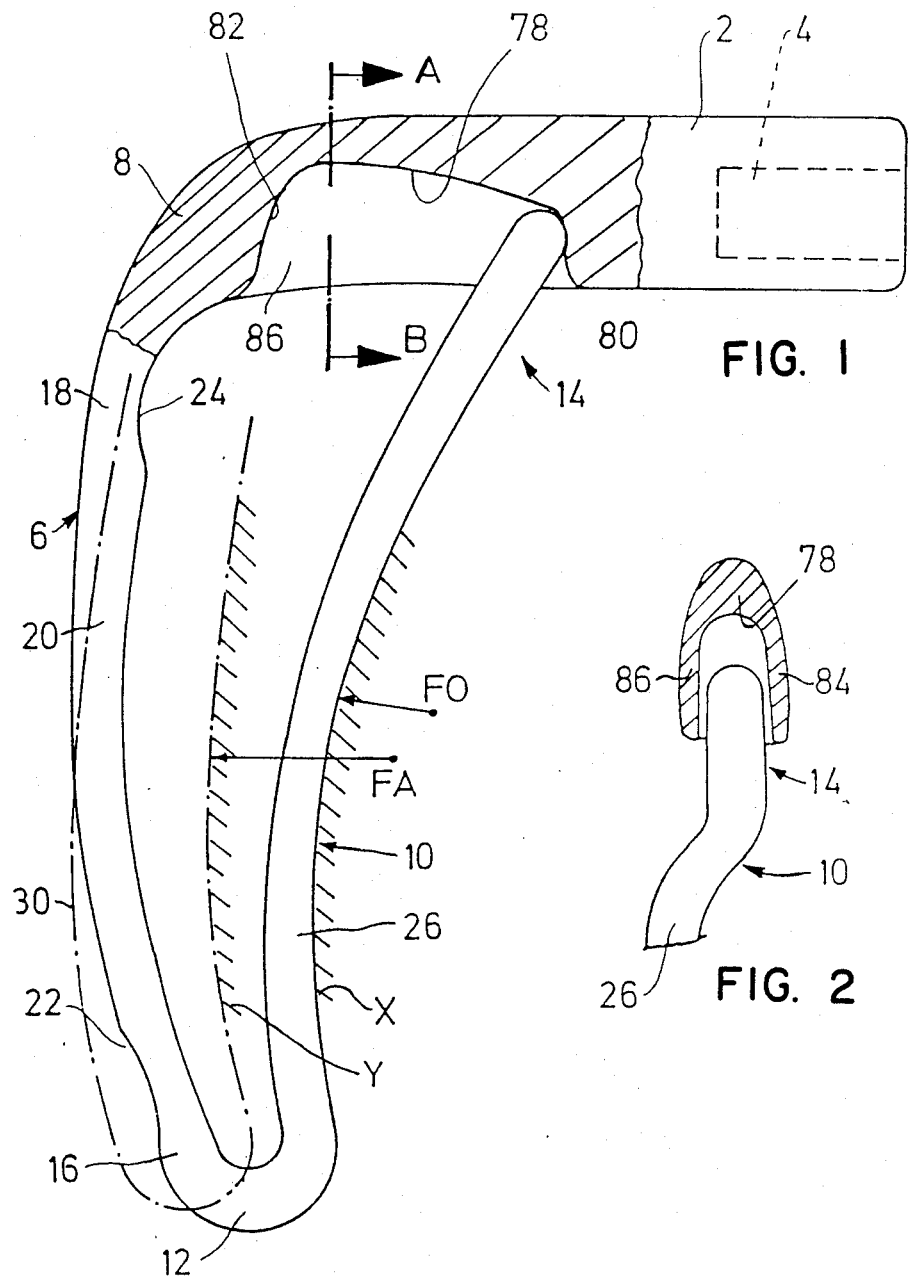

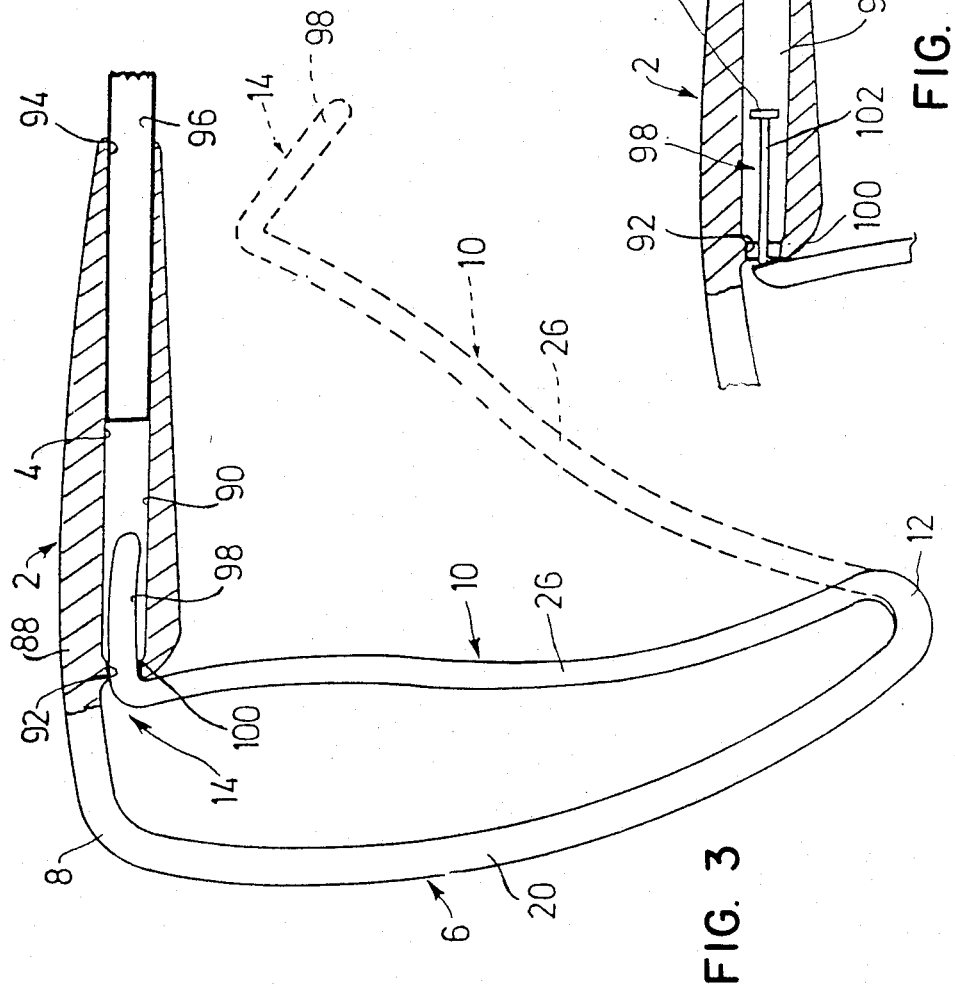

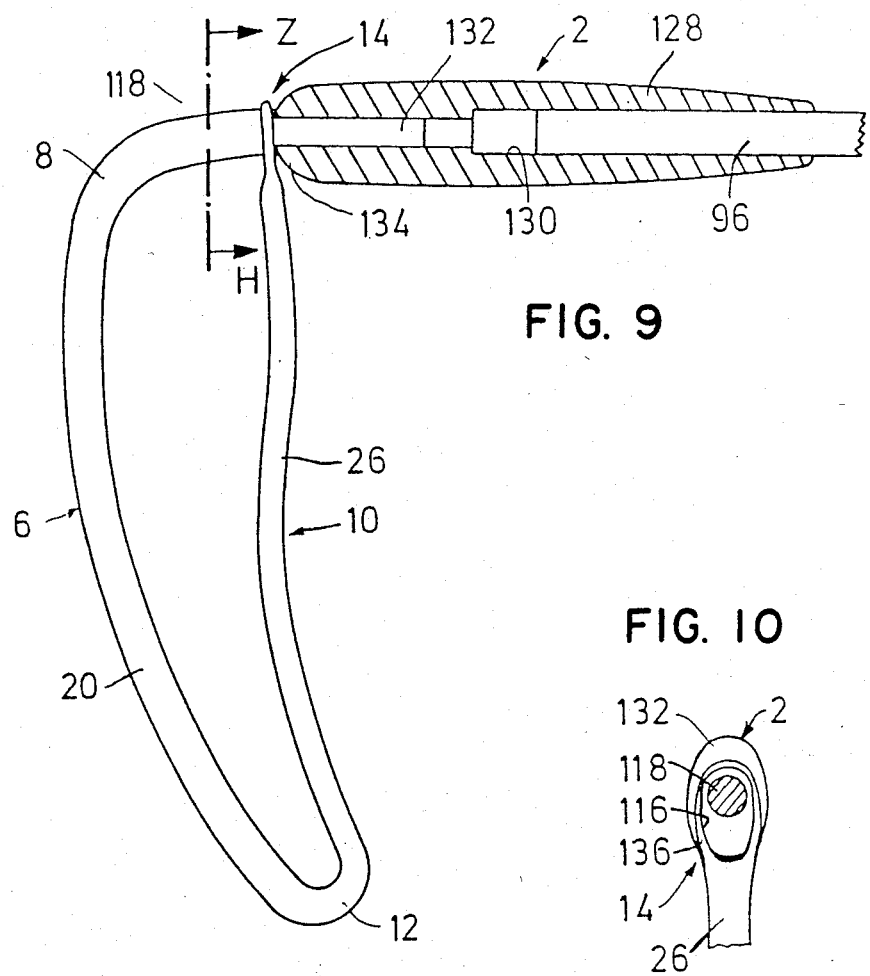

TEMPLE END PIECE FOR A TEMPLE OF A SPECTACLE FRAME

FIELD OF THE INVENTION

The present invention relates to a temple end piece for a temple of a spectacle frame.

DESCRIPTION OF PRIOR ART

Such a temple end piece belongs to the state of the art by virtue of my co-pending application Ser. No. 661,224 filed Oct. 15, 1984 now U.S. Pat. No. 4,652,098. In this latter temple piece belonging to the state of the art the fitting segment is supported in its middle region or below it on the remainder of the temple end piece and is thus supported on the temple. At least the upper half of the fitting segment projects freely upward. This geometry of the temple end piece causes the fitting segment to be kept diagonally down and to the rear and for forces also directed diagonally upward and forward to be exercised by it, if necessary, and for the deflection movements of the fitting segment caused by the inner elasticity of the material of the temple end piece or made possible by elastic elements purposely supplied in the temple end piece and exercised by forces directed to the rear on the fitting segment to shift the upper, free end of the fitting segment the strongest (by comparison to the remaining areas of the fitting segment) or at least strongly. This means that the restoring force effected by the deflection and exercised by the fitting segment or acting on it as a reaction force acts below an angle all the more favorable, the stronger the deflection is. The angle will be all the more favorable, the lesser the reaction force component directed vertically upward is working on the temple end piece. This becomes all the smaller with the same amount of reaction force, the farther the upper end of the fitting segment is deflected to the rear.

This formation described and known in the art, i.e. the behavior of the temple end piece caused by this in the event of an elastic deformation, thus causes the spectacle frames or the spectacles to which such temple end pieces belong to be pulled back by the temple end pieces in the event the spectacles are shifted, without this backward pull motion's being superimposed with any notable upward shoving of the temple end pieces.

The spectacles thus return more easily to their starting positions, so that the wearer of the spectacles need correct the position of the spectacles less frequently. This is accomplished by the particular manner of the support of the fitting segment on the remainder of the temple end piece, whereby the fitting segment can be shaped so massively and rigidly that is need not be laboriously threaded on behind the ear—as in the case of wire temples. The fitting segment of the temple end piece can be so designed that it reposes either on the head or behind the ear on the head and behind the ear simultaneously. Preferably, however, it will repose essentially at the rear against the auricle, specifically in the region of the furrow or groove between the auricle and the skull. Essential for the temple end piece known in the art is for the fitting segment to be so retained and conducted that at the point when is comes to a deflection of the fitting segment, this deflection movement will not cause a deterioration of the intensity of force of the fitting segment on the head and/or the skull. The geometry of the elements of the temple end piece and the distribution of the elastic properties on the elements of the temple end piece have been adapted to this purpose. This mounting and behavior of the fitting segment makes it possible simultaneously for the fitting segment to align itself readily into the desired position when the spectacles are put on and by virtue of this for pressure concentrations to be precluded. Part of this is the fact that the least force is necessary to deflect the upper end of the fitting segment by a given amount, causing precisely that area of the fitting segment which must absorb, if necessary, the weight portion of the spectacles to be supported by the temple assigned to have the largest resiliency and thus readily be capable of assuming an optimum position.

Although this temple end piece known in the art already thus demonstrates very favorable properties, certain disadvantages have also come to fore, specifically in putting on and taking off the spectacles. Both arranging the temple end pieces behind the ears at the time the spectacles are put on and the forward pull of the temple end piece from the area behind the ears at the time the spectacles are removed require somewhat more attention and effort on the part of the spectacle wearer than would be the case, for example, with so-called drop end earpieces.

The problem is thus to design a more convenient manner of handling for spectacles with these temple end pieces known in the art.

OBJECTS OF THE INVENTION

The present invention is based on the object of designing temple end pieces in accordance with the present category in such a manner that it can be fitted into place behind the ear more comfortably when the spectacles are put one and removed from the area behind the ear more easily when the spectacles are being removed.

SUMMARY AND ADVANTAGES OF THE INVENTION

In the temple end piece in accordance with the present invention provision has been made for the first segment to guide the upper end of the fitting segment within a certain range by virtue of the mutual enclosure by the upper end and the first segment, yet without preventing the deflection movement of the fitting segment. The fitting segment can thus carry out the desirable deflection movement now as then, as described above in detail, in which the intensity of force of the fitting segment on the head and/or the ear is at least not diminished; simultaneously, however, the first segment supports the upper end of the fitting segment in at least one direction at right angles to the direction of deflection, so that the fitting segment cannot essentially shift at least on this cross-direction relative to the first segment when the spectacles are being put on or taken off and is taken along or led by the first segment. Thus makes it easier to put the spectacles on or take them off.

A further advantageous characteristics resulting from the configuration of the temple end piece in accordance with the present invention consists of the fact that because of the contact between the upper end of the fitting segment and the first segment the boundary of the region bordered by the first segment, the connecting segment and the fitting segment is closed. This has the practical advantage that no objects, and especially no hair, can get through between the upper end of the fitting segment and the first segment to the bordered area that could get entangled between the connecting segments and the fitting segment and thus impede the removal of the spectacles especially. This means in other words that the hook-form shape of the different embodiments of the temple end piece belonging to the state of the art in which the upper end of the end region of the fitting segment is shaped as an exposed hook tip are avoided in the temple end piece in accordance with the present invention and is replaaced or improved on by a loop-shaped figure.

The mechanically carrying connection between the fitting segment and the remainder of the temple end piece is also constituted in the temple end piece in accordance with the present invention by the transition area between the connecting segment and the fitting segment. The essential deflection movement of the fitting segment, i.e. the deflection movement resulting in the direction backward to the connecting element is essentially determined with respect to the elastic forces thereyby arising as well as the respective positions assumed by the fitting segment when charged by the support of the fitting segment in the transition region and by the elastic properties of the connecting segment and the fitting segment. This deflecting behavior should be affected as little as possible by the contact provided for in the temple end piece in accordance with the present invention between the upper end of the fitting segment and the first segment. Preferably the contact will thus be of a sort that sufficient mechanical play will exist between the upper end of the fitting segment and the first segment.

The temple end piece in accordance with the present invention can be made both as a separate structural component and connected once it has been produced to the remainder of the spectacles or made at the same time as the remainder of the spectacles, whereby the remainder of the spectacles will then merge directly into the first segment of the temple end piece or the first segment of the temple end piece will be the latter end piece of the shaft of the frame.

Additional embodiments and characteristics of the present invention may be seen in the subordinate claims as well as the following descriptions of the embodiments, with reference to the drawings.

DESCRIPTION OF DRAWINGS

FIG. 1 is a side view of a first preferred embodiment of a temple end piece;

FIG. 2 is a sectional view along line A-B in FIG. 1;

FIG. 3 is a view corresponding to FIG. 1 of a second embodiment;

FIG. 4 is a sectional view of a variant of the second embodiment in accordance with FIG. 3;

FIG. 9 is a view corresponding to FIG. 3 of a fifth embodiment; and

FIG. 10 is a sectional view along line G-H in FIG. 9.

DETAILED DESCRIPTION OF THE INVENTION

Figure 5:
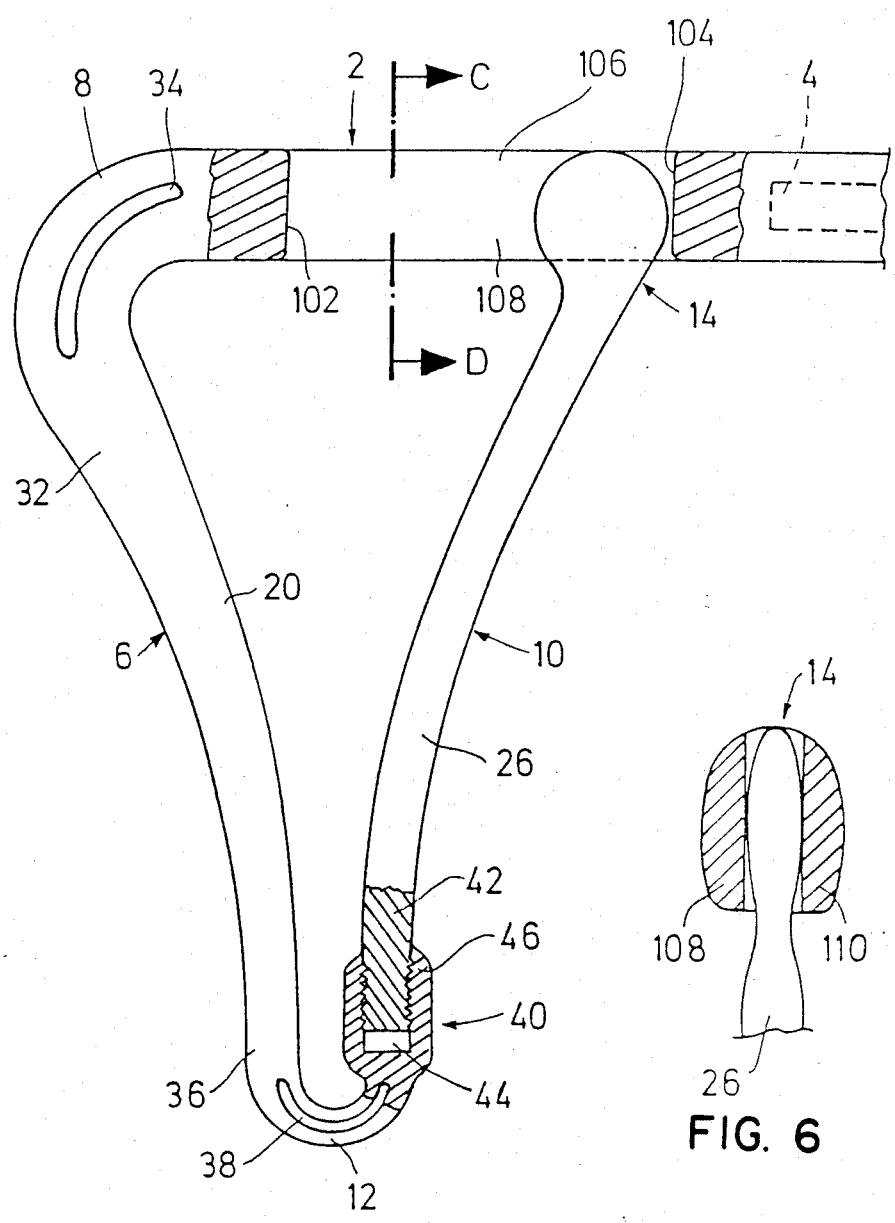
FIG. 5 is a view corresponding to FIG. 1 of a third embodiment.

In the following the first preferred embodiment will first be explained with reference to FIG. 1 and 2.

The temple end piece shown has a straight, elongated first segment 2, which can be formed in one piece with a spectacle shaft, not shown, or—as in the case illustrated—connected to the end of the spectacle shaft, not shown, for which purpose the first segment has an insertion opening 4. The first segment 2 has a rounded-off, right-angled profile.

At the back end, or in FIG. 1 left end, of the first segment 2, this segment is connected to the upper end of a connecting segment 6. The first segment 2 and the connecting segment 6 are formed with one another in one piece; the ends connected with one another form a first transition area 8. The first transition area 8 is curved in an arc and leads from the essentially horizontally running first segment gradually over into the connected element 6 running essentially vertical, which for its part is curved in an arc, whereby the inner side of the curvature is facing in FIG. 1 to the right. When the spectacles are mounted, this inner side of the curvature will face the ear.

The connecting segment 6 is connected at its lower end to the lower end of the fitting segment 10. These two ends form a second transition area 12. The connecting segment 6 and the fitting segment 10 are also formed in one piece with one another. The transition are 12 is curved in an arc and leads gradually from the slightly curved connecting segment over to the fitting segment 10 running essentially vertical with respect to the first segment 2.

The fitting segment 10 is curved in the shape of an arc, as can be seen in FIG. 1, whereby the inner side of the curvature faces to the front, or as seen in FIG. 1 to the right. The fitting segment 10 is intended to be placed for fitting the head and/or behind the ear and by this means to support the back end of the spectacles. This support of the back end of the spectacles serves the purpose of introducing a portion of the force of the weight of the spectacles to the head and in addition of protecting the spectacles against shifting to the front and slipping down the bridge of the nose. Preferably the fitting segment 10 will repose against the auricle from behind, specifically in the region of the ridge or furrow between the skull and the auricle. The fitting segment 10 is not only curved in the drawing plane of FIG. 1, but also verticallly (see FIG. 2), whereby the fitting segment can be fitted by virtue of this curvature anatomically in its course to the form of the auricle and the skull in order in this manner to make the contact area as large as possible and thus to make the pressure occurring with a given force as small as possible.

The fitting segment 10 is approximately as long as the connecting segment 6 and in the preferred embodiment illustrated has a circular profile (not shown) with a constant cross-section area over the entire length of the fitting segment 10. The strength and thickness of the fitting segment 10 and the material properties are so attuned to one another that the fitting segment 10 becomes an elastic element in the manner of a leaf spring.

The connecting segment 6 has an elastic region 16 near its lower end. In addition, the connecting segment has an additional, upper elastic region 18 near its upper end. The cross-section profile (not shown) of the connecting segment 6 is circular in form or oval and has approximately the same plane surface over the entire length of the connecting segment 6, whereby the connecting segment 6, however, at first tapers off slightly proceeding from its upper end. The elastic regions 16 and 18 also do not have the identical cross-section areas as the middle region 20 of the connecting segment 6. In each of the elastic regions are found recesses 22 and 24, through which the cross-section areas of the connecting segment 6 in the elastic regions 16 and 18 are narrowed by comparison to the middle region 20 and the remaining area of the connecting segment 6. The two elastic regions 16 and 18, in which the connecting segment 6 is thus weakened, act in the manner of an elastic joint, e.g. of a joint in which a deflection from the normal position oppose elastic forces. In addition, the dimensions and the material properties in the connecting element 6 are attuned with one another in such a manner that the connecting segment is an elastic element in the manner of a leaf or wire spring, whereby this leaf spring is more rigid than the leaf spring formed by the fitting segment 10.

The first transition region 8 is somewhat flattened out, whereby this flattening out is located essentially in the plane formed by the first segment 2 and the connecting segment 6. The first transition area 8 connects the first segment 2 and the connecting segment 6 relatively rigidly.

At the middle region 26 of the fitting segment 10 the upper end 14 of the latter is joined and this is shaped in the form of a straight extension of the middle region and has the same cross-section profile as the middle region 26. In FIG. 1 the upper end 14 is rounded off in the shape of a semi-circle. In the first segment 2 a longitudinal slot 78 is formed, into which the upper end 14 of the fitting segment 10 juts, as is shown in FIG. 1 and 2. This longitudinal slot 78 is shaped in such a manner that it will not impede the essentially left-directed (as seen in FIG. 1) deflection movement, despite the end's 14 projecting into the longitudinal slot 78. As may be seen especially in FIG. 2, the longitudinal slot encloses the upper end 14 laterally with free space. At the front or right (as seen in FIG. 1) end of the longitudinal slot 78 the base of the longitudinal slot 78 transforms into a catch 80 on which the upper end 14 reposes when the fitting segment 10 is not deflected; this state is depicted in FIG. 1. At the back or left (as seen in FIG. 1) end the base of the longitudinal slot 78 transforms into a second catch 82 which defines the deflection motion of the fitting segment 10 toward the left, as seen in FIG. 1. Through this means it protects the fitting segment 10 from too sharp a deflection and thus from damage or plastic deformation. The upper end 14 reposes against the front catch 80 in the position shown in FIG. 1 with a certain residual stress. This makes it possible for the fitting segment 10 and, if necessary, the connecting segment 6 to form as weak springs (lower elastic constant) and simultaneously to guarantee that the requisite reaction forces can be absorbed by the fitting segment. The upper end 14 is guided and secured by the two side walls 84 and 86 of the longitudinal slot 78 and these make the longitudinal slot deep enough for the upper end 14 of of the fitting segment 10 not be to pushed out of the longitudinal slot 78 by shearing forces (vertical to the drawing plane of FIG. 1), as long as these shearing forces are kept within the range of the magnitude occurring in normal use of the spectacles.

It is shown in FIG. 2 that the upper end 14 of the fitting segment 10 is laterally offset relative to the middle region 26 of the latter, so that the fitting segment 10 can be adapted in the manner described above to the form of the auricle or course of the furrow between the ear and the skull also in the cross direction of the head.

As will be seen from the above detailed description and is evident in the figures, in the first preferred embodiment the fitting segment 10 is kept and supported solely at its lower end. All of the remainder of the fitting segment 10, i.e. both is upper and its lower halves, as well as its middle region 26, juts freely upward, whereby the upper end 14 of the fitting segment 10 is covered over and encased by the first segment 2.

Because of the above described configuration the temple end piece has elastic properties and a certain deflection pattern under stress. The temple end piece is represented in FIG. 1 with solid lines in the unstressed state. At the same time this representation can be taken as a representation of the temple end piece of the mounted spectacles, the fitting segment 10 of which would, in any event, be moved somewhat slightly to the left in FIG. 1 and has been brought into the position shown in FIG. 1 in solid lines by normal stressing with the spectacles in place. The latter-mentioned mode of observation is based on the following. In FIG. 1 that contact area X is marked in hatchings in which the fitting segment 10 is in contact with the ear and head when the spectacles are in place and no particular forces are acting on the spectacles, but rather the force of its weight alone. By virtue of the elastic properties of the fitting segment 10, the elastic regions 16 and 18, as well as of the remainder of the connecting segment 6 the temple end piece can yield in the requisite degree when the spectacles are put on in such a manner that the fitting segment 10 will adapt to the reposing surfaces on the head and ear and will fit snugly without pressure peaks. Because the fitting segment 10 is firmly attached solely at its lower end, with the action of any given force on the fitting segment 10 its upper end will be deflected the farthest, namely approximately along an arc around the second transition region 12. If the share of the force of weight from the fitting segment 10 devolving to the temple attached to the temple end piece should also be introduced, the deflecting behavior described above of the fitting segment 10 will have the advantage that it is precisely the upper segment of the fitting segment 10 which must principally support the share of this weight, has the greatest flexibility and can thus easily move with the action of this share of the force of weight into a position in which no disturbingly high pressure will appear in the contact area.

If stronger forces arise in the temple (not shown) running essentially in its longitudinal direction, or to the right as seen in FIG. 1, as can be the case, for example, with a rather sharp head movement or blows against the spectacles, the temple end piece will deform more sharply. The middle line 30 of the deformed temple end piece is shown in FIG. 1 to represent such an instance, if only for the connecting segment 6, the second transition region 12 and the fitting segment 10 since the first segment 2 and the first transition area 8 for all purposes do not deform.

A pulling force in the temple (not shown) directed to the right as seen in FIG. 1 causes a reaction force exercised by the ear and skull on the temple end piece (as seen on the right in FIG. 1), and this is relayed in the contact area. Because of this stressing the connecting segment 6 is moved somewhat clockwise as seen in FIG. 1 in the joint formed by the upper elastic region 18. At the same time the connecting segment 6 is slightly stretched, owing to its leaf-spring property. In the elastic joint formed in the lower transition area 12 a movement takes place in a counter-clockwise direction, and the fitting segment 10 is stretched somewhat because of its leaf-spring property and is moved around its lower end in a counter-clockwise direction. Through this the course results as shown in FIG. 1 for the middle line 30. The fitting segment 10 is raised somewhat more rigidly, i.e. movement in a counter-clockwise direction, and shifted to the left as viewed in FIG. 1. For this deflected position the contact area Y is again shown schematically with hatches, whereby it is understood that the fitting segment 10 reposes with its surface in the deflected position and not with its middle line as the only one shown. Because of the described deflection movement and shifting of the fitting segment 10 the contact area Y is located somewhat lower than the contact area X. For both contact areas X and Y the resulting reaction force from the ear and skull on the fitting segment is sketched in schmatically with an arrow in FIG. 1, namely as the reaction force FO for the spectacles worn in place without any special stressing and as the reaction force FA for the instance when the fitting segment 10 is sharply deflected. From the above explanation is will follow, and from FIG. 1 is will be evident, that the directions of the reaction forces FO and FA differ from one another through the fact that the reaction force FA runs "flatter" than the reaction force FO, i.e., that the direction of the reaction force FA has arisen from the direction of the reaction force FO through turning in a counter-clockwise direction. The force component share directed vertically upward of the reaction share is by virtue of this smaller than the share of the force component directed vertically upward of the reaction force FO. The reaction force FA, which seeks to restore the temple end piece and thus the entire spectacles back into their starting position, thus has essentially the desired strong horizontal force component which will strive to pull the spectacles backward, i.e., to the left as seen in FIG. 1, and only a relatively weak vertical force component directed upward or none at all which would lift up the temple end piece in an undesired manner.

The above described behavior as spring and joint of the temple end piece is caused essentially by the geometric relation of the first segment 2, the connecting segment 6 and the fitting segment 10, i.e. caused by the fact that the fitting segment has a relatively long end region projecting freely upward. By virtue of this, it is basically set out in which way the fitting area will shift under stressing. This shifting is supported and controlled by an appropriate selection of the elastic properties of the three segments of the temple end piece and, where indicated, the provision of special elastic area. To the extent the elastic and deflection behavior of the fitting segment has been described in the foregoing, it is not impeded or affected by the engagement of the upper end 14 of the fitting segment into the first segment 2 since free space is created in the form of a longitudinal slot for the movement of the upper end 14 within the connecting segment. Only when additional shearing forces or shearing force components occur vertical to the drawing plane of FIG. 1 will a certain tractive stress occur because of the contact between the upper end 14 and one of the side walls 84 and 86, which stress, however, since in consideration of the circular profile of the upper end 14 will in any event be a linear contact, will be absolutely small and so low in relation to the forces acting on the temple end piece that the elastic and deflecting behavior will be for all purposes unchanged even if tractive stresses should appear. The statement that the end area of the fitting segment 10 of the temple end piece in accordance with the present invention projects "freely" upward in the direction toward the first segment—even though the upper end 14 and the first segment 2 are interconnected with one another—thus means that the fitting segment 10 is held firmly attached in the second transition area 12 and is conducted in its desired essentially backward directed deflection movement by this firm attachment and is for all purposes unimpeded by the interconnection between the upper end 14 and the first segment 2. This interconnection in turn prevents movements of the upper end 14 in directions deviating from the one desired deflection movement of the end segment—in the first preferred embodiment described, for example, vertical to the drawing plane of FIG. 1—and in addition to this, limited, if need be, by the catches 80 and 82. This set of facts can also be described by stating that the fitting segment is firmly attached in the region of its longitudinal middle or its lower half—in the form of a joint, if required—but at its upper end is conducted translatorally movable in at least one direction, whereby the requisite arresting force are introduced at the site of this firm attachment.

The interlocking between the upper end 14 of the fitting segment 10 and the first segment 2 results in the fitting segment's 10 being guided directly at its upper end 14 by the first segment 2 when the spectacles are put on, so that it is possible by manipulation at the appropriate temple of the spectacle frame to position the fitting segment 10 in the desired manner on the head and/or behind the ear. In any event, this ability of manipulation is sooner afforded than would be the case if the upper end 14 were freely movable on all sides. When the spectacles are taken off, the upper end 14 in turn is protected by the first segment 2 as well as by a hood or cap, so that the upper end 14 cannot get caught in the hair or skin and remain stuck. Finally, provision is made by virtue of the described interconnection between the upper end of the fitting segment 10 and the first segment 2—when seen from the side of the temple end piece as shown in FIG. 1—for there to be no intervening space between the upper end of the fitting segment 10 and the first segment 2 through which hair or other objects can otherwise penetrate into the region bordered by the first segment 2, the connecting segment 6 and the fitting segment 10.

DESCRIPTION OF THE SECOND EMBODIMENT OF THE INVENTION

In the following the second embodiment will be explained with reference to FIG. 3, whereby the same reference numerals are used for the parts identical with or analagous to those in the first preferred embodiment and essentially only differences from the first preferred embodiment are explained.

In the second embodiment in accordance with FIG. 3 the fitting segment 10 and the connecting segment 6 each have over their entire length an essentailly constant circular profile (not shown), whereby the fitting segment 10 is formed thinner than the connecting segment 6. The temple end piece in accordance with the second embodiment does not have specially formed elastic regions such as the elastic regions 16 and 18 of the first preferred embodiment. The connecting segment 6 transforms at its upper end into the first segment 2, whereby both the transition region 8 and the area of the first segment 2 adjoining it still has essentially the same cross-section profile as the connecting segment 6. The first segment 2 have a thickened main area 88, in which a straight borehole 90 running in the longitudinal direction of the first segment has been formed, which borehole has a back, open borehole end 92 facing the connecting segment 6 and has a second open borehole end 94. The borehole 90 has the same cross-section area over its entire length with the exception of the first borehole end 92; the first borehole end 92 has by contrast to the latter a narrower cross-section area. A temple shaft end 96 is inserted into the borehole 90 through the second borehole end 94, by means of which the temple end piece and the remainder of the temple (not shown) are connected with one another.

The upper end 14 of the fitting segment 10 has a rod-shaped extension 98 formed in one piece with the remainder of the fitting segment 10 and this inserts through the first borehole end 92 on through into the borehole 90. The extension 98 is slightly curved, whereby the curvature middle point is situated in the second transition region 12 between the connecting segment 6 and the fitting segment 10. In spite of the narrowed formation of the first borehole end 92, there is play between this borehole end and the inserted extension 98. In addition to this, the borehole 90 and the extension 98 are dimensioned in such a manner that despite the curvature of the extension 98 it in the borehole at the position shown in solid lines has no contact with the borehole wall.

A shoulder 100 surrounding the first borehole end 92 is formed on the first segment 2, against which shoulder the upper end 14 of the fitting segment 10 rests when the latter is in the undeflected state. The temple end piece in accordance with the second embodiment is made, for example, in one piece as a plastic component, whereby the unstressed position of the fitting segment with its end 14 is shown in broken lines in FIG. 3. The fitting segment 10 is moved from this position shown in broken lines in counter-clockwise direction over to its position drawn in solid lines in such a manner that the right end as seen in FIG. 3 of the extension 98 can be introduced through the second borehole end 92 into the borehole 90. When the fitting segment 10 is subsequently released, it assumes the position shown in solid lines in FIG. 3, in which it remains under residual stress since it cannot return to its unstressed position because of its resting against the shoulder 100.

The elastic and deflecting behavior of the temple end piece in accordance with the second embodiment corresponds basically to the elastic and deflecting behavior of the first embodiment and will hence not be explained anew. In the deflection movement of the fitting segment 10 directed to the left as seen in FIG. 3 the interconnection between the extension 98 and the borehole 90 is maintained so that the fitting segment 10, while being capable of performing the desired deflection movement, is simultaneously prevented from performing wider movements diagonally to the axis of the extension 98, however, by virtue of its being surrounded at its free end 14 by the first segment 2. The constricted borehole end 92 has this guiding effect over the entire scope of the extension 98. Under normal stresses the extension 98 will in any event be in contact with the inner wall of the constricted borehole end 92 while there will be no contact with the remainder of the borehole 90. Because of this the tractive stress that counters a shifting movement of the extension 98 in the borehole 90 will be low. One particular feature of the formation in accordance with FIG. 3 by comparison to the formation in accordance with FIG. 4 is the fact that the configuration in accordance with FIG. 3 the first segment 2 can have a slightly lower height (interval between upper and lower limits of the main area 88 in the drawing plane of FIG. 3), that the area between the main area 88 and the first transition region 8 can be formed slenderly and that the borehole 90 fulfills a dual function, viz. of accommodating both the temple shaft end 96 and the extension 98. Finally, another special feature of the embodiment in accordance with FIG. 3 consists of the fact that the fitting segment 10 under rather sharp deflection out of the position shown in FIG. 3 can also perform a certain transverse movement, i.e. a movement vertical to the drawing plane of FIG. 3 if specifically the bent extension 98 is not inserted over its entire length into the borehole 90 but protrudes out of it partly to the left.

FIG. 4 shows a variation in section of the second embodiment in accordance with FIG. 3. The difference between the two preferred embodiments in accordance with FIG. 3 and 4 consists of the fact that in the variant in accordance with FIG. 4 the extension 98 is designed in the form of wire-shaped element 102 which is attached at its one end to the remainder of the fitting segment and at its other end is connected to a disk-shaped thickening 104. By virtue of the design of the extension in the form of a wire-shaped element 102, the extension 98 can readily yield in case of contact with the inner wall of the first borehole end 92, so that the deflection movement of the fitting segment 10 will be countered by even less tractive stress than in the case of the rod-shaped extension 98 in accordance with FIG. 3. The disk-shaped thickening represents a guarantee against a complete extraction of the extension 98 from the borehole 90. For the initial introduction of the thickening 104 into the borehole 90 the thickening 104 can be tipped slightly so that it can be pushed through the first borehole end 92.

This varient in accordance with FIG. 4 will also guarantee, as does the embodiment in accordance with FIG. 3, that the definition of the area enclosed by the first segment 2, connecting segment 6 and fitting segment 10 remains closed, so that especially no hair can penetrate into this area. The diagonal mobility of the fitting segment 10 will be greater when the fitting segment is deflected in will be the case for the embodiment in accordance with FIG. 3. Through choice of the thickness and flexibility of the wire-shaped element 102 the degree of this diagonal mobility can be affected. Attention should be given to the fact that even in the varient in accordance with FIG. 4 in the instance when the fitting segment 10 is resting against the shoulder 100, which will be the case as a rule when the spectacles are being put on or taken off, a diagonal movement vertical to the axis of the extension will be largely forestalled.

DESCRIPTION OF THE THIRD EMBODIMENT OF THE INVENTION

In the following the third embodiment will be explained with reference to FIG. 5, whereby the same reference symbols will be used for components identical or analagous to those in the first preferred embodiment and essentially only differences to the first preferred embodiment will be explained.

Figure 6:
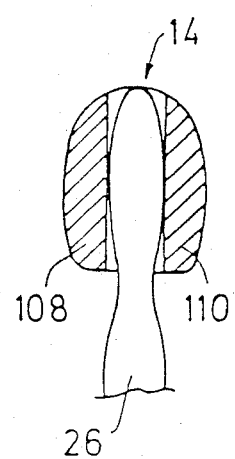
FIG. 6 is a sectional view along line C-D in FIG. 5.

In the third embodiment in accordance with FIG. 5 and 6 the connecting segment 6 is once more shaped in the form of an arc, whereby the inner side of the curvature, however, is facing away from the ear. In addition, the cross-section area of the connecting segment 6 changes over its entire length, whereby it tapers down proceeding from its upper end. Because of this, the connecting segment 6 is relatively rigid in its upper end region 32 and also still in its middle region. The curvature provided for in the second [sic] embodiment leaves more free space for the deflection of the upper end 14 of the fitting segment 10 than is available in the first preferred embodiment.

The first transition region 8 in the third embodiment has essentially the same profile as the first segment and the end region 32. In the transition region 8 a slit has been formed which follows approximately the curvature of the transition region 8 and by means of which the transition area is weakened. In this manner the transition region 8 is shaped as an elastic area representing an elastic joint between the more rigid first segment 2 and the more rigid upper end region 32 of the connecting segment 6. The second transition region 12 is designed in a similar manner and has approximately the cross-section profile of the lower end region 36 of the connecting segment 6 and is supplied with a slit 38 which follows the curvature of the second transition area 12. This slit attenuates the second transition area 12 and makes it an elastic area which is more elastically yielding than the bordering ends of the connecting segment 6 and the fitting segment 10 and thus constitutes an elastic joint between these two segments. This transition regions 8 and 12 designed as elastic regions thus fulfill the function in the third embodiment in accordance with FIG. 5 of the elastic regions 16 and 18 of the first preferred embodiment, those accordingly not being supplied in the third embodiment.

In contrast to the design of the connecting segment 6 and the fitting segment 10 in one piece in the first and second embodiments, in the third embodiment these two segments are first made as separate structural components which are connected to one another by means of a connecting device 40. This connecting device comprises a plug 42 formed on the lower end of the fitting segment 10 and supplied with knurls on its outside and a plug borehole 44 in a socket 46 formed in the second transition area 12 and constituting one of its ends. The socket 46 points essentially upward to the first segment 2. The plug 42 is inserted into the smooth plug borehole 44, whereby a firm notched connection is yielded from the cold-flow of the plastic material. A prior separate production of the connecting segment 6 and the fitting segment 10 makes its possible to combine an otherwise fixed temple end piece with a choice of different fitting segments 10, depending on the individual needs of the spectacle wearer.

It will be obvious that as a variant to the embodiment shown in FIG. 5 the socket 46 and be formed on the fitting segment 10 and the plug 42 on the transition region 12 and that furthermore the connecting device 40, instead of being situated on the right end (as seen in FIG. 5) of the transition region 12, can be located on its left end.

In the essentially straight area of the first segment 2 is situated directly anterior to the first transition region 8 an upper and lower open longitudinal slot 106, into which the upper end 14 of the fitting segment 10 projects from below. This upper end 14 is designed as a lenticular, flattened out disk, the greatest diameter of which is situated in the drawing plane of FIG. 5, whereby this diameter will be greater than the diameters are of the remaining end area of the fitting segment.

The longitudinal slot 106 is bordered laterally by two side walls 108 and 110, with which the lenticular end 14 has a certain interval and with which the end 14 because of its lenticular shape will come if need be into point contact, so that the tractive resistance will accordingly be low. At the front and at its back end this longitudinal slot 106, similarly to the longitudinal recess of the first preferred embodiment, is marked off by a front catch 104 and a back catch 102, whereby the lenticular end 14 in the undeflected state reposes under residual stress against the front catch 104.

The deflecting and elastic behavior of the fitting segment 10 of the temple end piece in accordance with the third embodiment is basically the same as the deflecting and elastic behavior of the first preferred embodiment. The interlocking between the upper end 14 of the fitting segment 10 and the longitudinal slot 106 in the first segment 2 has the same purpose and same effect as in the first embodiment. The third embodiment differs from the second with respect to this interconnection essentially by virtue of the fact that the danger of the deflection movement's being obstructed by foreign matter deposited will be lessened because the longitudinal slot is open both top and bottom, by the fact because of the lenticular shape of the end that both tractive resistance is reduced as well as the danger of cants of the end 14 in the longitudinal slot 106 precluded, and that the first segment 2 need have a lower height than in the first preferred embodiment in order to allow for a comparably deep recess in the form of a longitudinal slot 106.

DESCRIPTION OF THE FOURTH EMBODIMENT

Figures 7, 8:
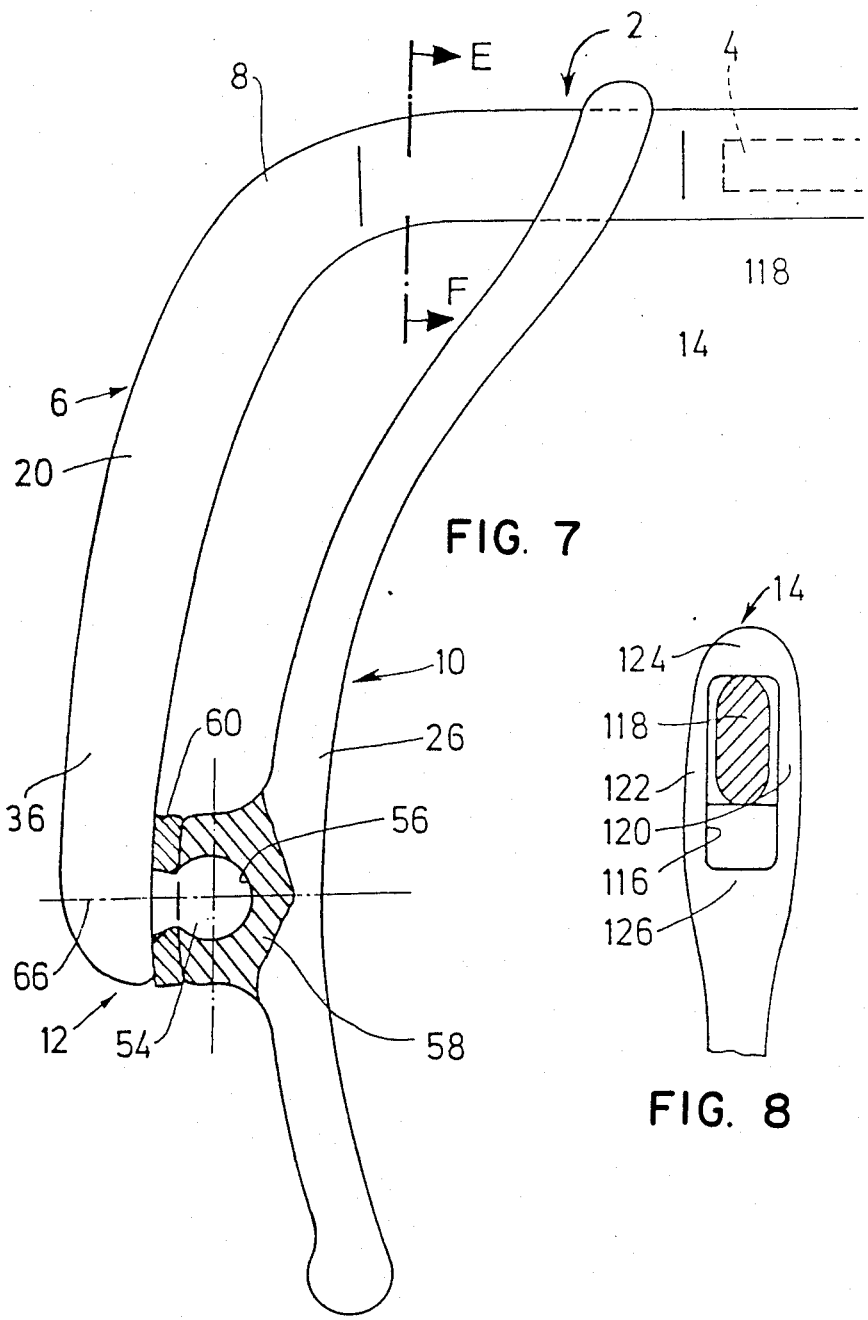
FIG. 7 is a view corresponding to FIG. 1 of a further embodimentof the invention.
FIG. 8 is a sectional view along line D-F in FIG. 7.

FIG. 7 shows a fourth embodiment, which differs from the above-described embodiments essentially in that the transition area 12 between the fitting segment 10 and the connecting segment 6 is formed by a ball-and-socket joint and that the upper end 14 surrounds the first segment 2 and not the reverse.

The ball-and-socket joint is comprised of a ball 54 formed at the lower end of the connecting segment 6 and a socket 56 adapted to it and which is formed in a protrusion 58 made in one piece with the fitting segment 10 on the side of which is facing away from the ear. The lower end of the connecting segment 6 and the protrusion 58 have areas facing one another that have a certain distance from one another. In the intervening space between these two areas in a ring element 60 made of elastically springy materials and inserted concentric to the ball 54. This results in the fact that the fitting element 10 can be shifted out of its normal position against the springy elastic resistance of the ring element 60. The protrusion with the ball socket 56 is situated in the middle region 26, namely slightly below the longitudinal middle of the fitting segment 10. It will be obvious, however, that the transition region 12 with the ball 54 and ball socket 56 can be located even farther down the fitting segment than shown in the illustration.

The first segment 2, the transition region 8 and the connecting segment 6 of the fourth embodiment in accordance with FIG. 7 have basically a similar design as the analagous components in the first preferred embodiment in accordance with FIG. 1, whereby in the fourth embodiment the connecting segment 6 is on the whole thicker and has no special elastic area such as elastic area 18. In the embodiment in accordance with FIG. 7 the fitting segment 10 especially has elastic resilience by virtue of its leaf-spring property and the connecting segment 6 also because of its leaf-spring property. The ring element 60 exercises no spring effect in the direction of the axis 66; however, the ring element 60 counters the shifting motions of the fitting segment 10 on the ball 54 with elastic resistance.

The upper end 14 of the fitting segment 10 has an aperture 116 that is dimensioned in such a manner that the first segment 21 passes through it, as shown in FIG. 7 and 8. In FIG. 8 especially is can be seen how the upper end 14 is shaped similar to a sewing needle end, whereby the thread eye of the sewing needle would correspond to the aperture 116. In FIG. 7 to the right an essentially straight area 118 of the first segment 2 adjoins itself to the first transition region 8. This straight area 118 has an essentially lenticular profile, as is shown in FIG. 8, and is that region which is directly interconnected with the upper end 14 of the fitting segment 10 and which runs through the opening formed in it. The opening 116 is bounded by two side walls 120 and 122 and an upper wall 124 and 126. The two side walls 120 and 122 have such an interval with one another that the area 118 is arranged in the aperture 116 with play, whereby even if the area 116 touches one of the two side walls, only a linear contact will occur owing to the lenticular profile of the area 118. The upper wall 124 and the lower wall 126 have such an interval from one another that the fitting segment can perform a deflection movement in the direction of the connecting segment 6 in the desired degree from its undeflected position shown in the illustration before the lower wall 126 comes to rest against the area 118, thus preventing any further deflection. In the undeflected position shown in the illustration the upper wall 124 rests against the area 118, which in turn makes it possible for the fitting segment 10 in its undeflected position to retain a certain residual stress.

Because of the described design the fitting segment 10 can assume a suitable position when the spectacles are put on by shifting on the ball 54, and in addition to this, by an appropriate elastic deformation can also adapt to the shape of the ear and/or head. Moreover, this adaptation is also supported by the elastic properties of the connecting segment 6 and, if required, by even the transition region 8. In the event of a fairly sharp force in the longitudinal direction of the first segment 2 toward the front, i.e., to the right as seen in FIG. 7, the fitting segment 10 resting on the head and/or ear would yield to the left relative to the first segment 2 as seen in FIG. 7. This is made possible to the fitting segment because of the elastic property of the connecting segment 6, whereby the fitting segment 10 simultaneously shifts around the ball 54 in a counter-clockwise direction. Superimposed on this is also an elastic deformation of at least the upper half of the fitting segment 10, whereby the upper half is somewhat distended because of this deformation and is shifted in the sense of being shifted around the two transition region 12. The deflecting and yielding movement of the fitting segment 10 resulting against elastic forces essentially causes a shifting of the entire fitting segment to the left (as seen in FIG. 7), whereby this shifting is superimposed with a slight shift of the fitting segment 10 in a counter-clockwise direction. By virtue of this, as in the case of the first preferred embodiment in accordance with FIG. 1, provision is made for a reaction force acting on the fitting segment 10 in which the portion of the component of force directed vertically upward will not be increased and which will strive to restore the first segment 2 and thus the temple essentially horizontally into its starting position.

The fitting segment 10 can perform the above-described deflection movement without being prevented from doing so it by the interaction beteen the upper end 14 and the first segment 2. This interaction is realized differently than in the previously described embodiments by the fact that the upper end 14 encases the first segment 2. This in turn has the effect that the first segment guides the upper end 14 when the spectacles are put on and taken off to the extent that it prevents lateral movements of the upper end 14, i.e., prevents motions vertical to the drawing plane of FIG. 7. Although the upper end 14 is free in the preferred embodiment in accordance with FIG. 7 and 8, it still cannot act as a hook behind which objects could get caught, because the area 118 running through the aperture 116 prevents such entanglement. One advantage of the above-described interaction between the upper end 14 and the first segment 2 is the fact that the first segment 2 is not weakened is the form of a recess, a longitudinal groove, a longitudinal slot, a borehole or the like, and is designed more complexly, and that the risk is slight that deposits in the region of the interaction between the upper end and the first segment will impair the deflection movement.

DESCRIPTION OF THE FIFTH EMBODIMENT OF THE INVENTION

A fifth embodiment of the present invention is shown in FIG. 9 and 10, whereby once more the identical reference numbers are used for elements and components already explained, these not being explained anew.

The formation of the temple end piece as a whole is similar in the fifth embodiment to that in the second embodiment 22 FIG. 3, whereby the measures for achieving the interconnection between the upper end 14 and the first segment, however, resembled those of the fourth embodiment in accordance with FIG. 7 and 8. As may be seen in FIG. 9, the first segment 2 is comprised of a cylindrical component 128 resembling in its external design the main region 88 of the embodiment in accordance with FIG. 3 and in which a straight, continuous longitudinal borehole 130 is formed, into which the template shaft end 96 is inserted at the right (as seen in FIG. 9). In addition, the first segment 2 comprises the region 118 adjoining the transition area 8 at the right (as seen in FIG. 9), on which in turn a straight plug 132 has been formed, which is inserted into the narrower left segment of the longitudinal borehole 130. The area 118 essentially has the identical circular profile as the connecting segment 6 and rests with its right end against a shoulder 134 formed on the component 128 and surrounding the left end of the longitudinal borehole 130.

A thread-shaped element 136 belongs to the upper end 14 of the fitting segment 10, which element is formed in one piece with the remainder of the fitting segment 10. This thread-shaped element 136 is bent in the form of a loop in such a manner that its two ends merge into the remainder of the fitting segment 10. This loop defines the opening 116 through which the area 118 of the first segment 2 will run with play on all sides. Since the shoulder 134 extends radially farther than the surfaces of the area 118, this simultaneously forms a catch for the thread-shaped element 136 in the non-deflected position of the fitting segment 10, which is illustrated in FIG. 9.

The deflecting and elastic behavior of the temple end piece in accordance with the fifth embodiment in turn corresponds to that of the above-described embodiments, especially those of the first and second embodiments. Special advantages of the fifth embodiment lie in the fact that because of the thread-shaped design of the upper end 14 and the surrounding of the first segment 2 by the thread-shaped element, both tractive resistance and the risk of the deflection movement's being impeded by deposits in the area of the interaction between the upper end 14 and the first segment 2 is very slight. In addition to this, the constructive outlay necessary to produce this interconnection between the upper end 14 and the first segment 2 is slight, so that a relatively slender first segment 2 is the result and the means of interconnection provided for on the fitting segment 10 are barely noticeable.

It will be obvious that countless variants of the above-described embodiments can be undertaken. In particular, a certain design as provided for in any one of the embodiments of the interconnection between the upper end 14 and the first segment 2 can be supplied in the remaining embodiments, instead of the one relevant design provided for in those remaining embodiments.

A temple end piece for a temple of a spectacle frame comprises an essentially straight first segment extending in the longitudinal direction of the temple, a connecting segment extending downward from the first segment, as well as a fitting segment intended for resting against the head and/or behind the ear. The longitudinal fitting segment is borne by the connecting segment and supported by it, whereby this support is achieved at the longitudinal middle or at the lower end in the region between the longitudinal middle and the lower end of the fitting segment, so that the upper half of the fitting segment at least projects freely upward to the first segment and is capable of being elastically deflected in the direction of the connecting segment. This capability of an elastic deflection is given by virtue of the choice of a suitable material, e.g., by a suitable plastic material, and/or specially designed elastic regions. The upper end of the fitting segment stands in interconnection with the first segment in such a manner that the deflection movement will be unimpeded in the desired degree, and the upper end is simultaneously surrounded by the first segment or the first segment is surrounded by the upper end, so that the upper end can form no hook-like tips, and in addition to this, undesired deflecting movements are prevented.

I claim:

1. A temple end piece for a temple of a spectacle frame having an essentially straight first segment extending in the longitudinal direction of the temple, an elongated fitting segment intended for contacting the head and/or behind the ear and extending downwardly with respect to the first segment, and a connecting segment connecting the first segment to the fitting segment at or below the longitudinal middle of the fitting segment whereby at least the upper half of the fitting segment constitutes an end region projecting freely upwardly toward said first segment, from a transition area between the connecting and the fitting segments, the upper end of the fitting segment being engageable with the first segment in such a manner that said upper end can be moved freely in the longitudinal direction of the first segment from a first position rewardly toward said connecting segment and simultaneously the upper end of the fitting segment is enclosed by the first segment.

2. A temple end piece according to claim 1, wherein said first segment has a longitudinal groove therein, said upper end of the fitting segment projecting into said groove.

3. A temple end piece according to claim 2, wherein said longitudinal groove is downwardly open.

4. A temple end piece according to claim 1, wherein said first segment has a longitudinal slot formed therein, said upper end of the fitting segment projecting into said slot.

5. A temple end piece according to claim 4, wherein said longitudinal slot is upwardly and downwardly open.

6. A temple end piece according to claim 4, wherein said upper end is shaped as a flattened-out disk, the largest diameter of which lies in an essentially vertical plane.

7. A temple end piece according to claim 6 wherein the disk is lenticular in form.

8. A temple end piece according to claim 4, wherein the upper end is rounded off in the shape of a hemisphere.

9. A temple end piece according to claim 1, wherein the upper end of said fitting segment is moveable in a longitudinal groove in said first segment, said groove having a stop at the front end which defines the location of said first position.

10. A temple end piece according to claim 1, wherein said first segment has a longitudinally extending open borehole therein, the upper end of the fitting segment having an extension which projects longitudinally into said borehole.

11. A temple end piece according to claim 10, wherein said borehole has an open end having a smaller free cross-section area than the remaining extent of said borehole.

12. A temple end piece according to claim 10, wherein said extension is integrally formed on the end region of the fitting segment.

13. A temple end piece according to claim 12, wherein the extension is curved in the shape of an arc, whereby the center of curvature is situated in the transition region between the connecting segment and the fitting segment.

14. A temple end piece according to claim 11, wherein said extension is fastened at its one end to the free end of the fitting segment and on its other end has an enlarged head.

15. A temple end piece according to claim 10, wherein said open borehole end faces the connecting segment.

16. A temple end piece according to claim 15, wherein said borehole merges into an insertion opening for a temple shaft end and has a second open borehole end.

17. A temple end piece according to claim 1, wherein said fitting segment is pre-stressed such that said upper end is biased toward said first position.

18. A temple end piece according to claim 1, wherein said fitting segment is an elastic element in the manner of a leaf spring.

19. A temple end piece according to claim 1, wherein said connecting segment is curved in the shape of an arc, whereby the inner side of the curvature faces forward toward the ear.

20. A temple end piece according to claim 1, wherein the first segment and the connecting segment are integrally formed in one piece.

21. A temple end piece according to claim 1, wherein the connecting segment and the fitting segment are integrally formed in one piece.

22. A temple end piece according to claim 1, wherein the connecting segment and the fitting segment are separately made components.

23. A temple end piece according to claim 22, further comprising a plug and a plug borehole, into which the plug is inserted connecting said connecting segment with said fitting segment.

* * * * *